United States Patent
Li

(10) Patent No.: US 9,522,844 B2
(45) Date of Patent: Dec. 20, 2016

(54) LOW TEMPERATURE POLY-SILICON THIN FILM PREPARATION APPARATUS AND METHOD FOR PREPARING THE SAME

(71) Applicant: Shenzhen China Star Optoelectronics Technology Co., Ltd., Guangdong (CN)

(72) Inventor: Jia Li, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 127 days.

(21) Appl. No.: 14/408,337

(22) PCT Filed: Sep. 23, 2014

(86) PCT No.: PCT/CN2014/087179
§ 371 (c)(1),
(2) Date: Dec. 16, 2014

(87) PCT Pub. No.: WO2016/033844
PCT Pub. Date: Mar. 10, 2016

(65) Prior Publication Data
US 2016/0060167 A1  Mar. 3, 2016

(30) Foreign Application Priority Data

Sep. 3, 2014 (CN) .......................... 2014 1 0444447

(51) Int. Cl.
*F26B 21/06* (2006.01)
*C03C 17/245* (2006.01)
*C03C 23/00* (2006.01)

(52) U.S. Cl.
CPC ......... *C03C 17/245* (2013.01); *C03C 23/0025* (2013.01); *C03C 23/0075* (2013.01); *C03C 2217/262* (2013.01); *C03C 2218/31* (2013.01)

(58) Field of Classification Search
CPC .......... F26B 11/00; F26B 19/00; F26B 21/00; F26B 21/06; C03C 25/00; C03C 25/6233; C03C 17/00; C03C 17/245; C03B 25/00
(Continued)

(56) References Cited

U.S. PATENT DOCUMENTS 5,685,086 A * 11/1997 Ferrell .................... B08B 3/102
257/E21.228
5,913,981 A *  6/1999 Florez ...................... B08B 3/00
134/183
(Continued)

FOREIGN PATENT DOCUMENTS

CN        1694232        11/2005
JP        2003-133560     5/2003
(Continued)

*Primary Examiner* — Stephen M Gravini

(57) ABSTRACT

A low temperature poly-silicon thin film preparation apparatus and a method for preparing the same are disclosed, the preparation apparatus comprises a substrate cleaning tank and an ozone generating device connected thereto, such that not only can blow off residual liquid on a surface of a glass substrate, but can also allow the glass substrate to directly contact the ozone, such that a silicon film on the surface of the glass substrate is more smooth and less impure, and an oxide film formed on the surface is more uniform since it contacts with the ozone at the first time after being cleaned by hydrofluoric acid, therefore the crystalline effect is more excellent.

10 Claims, 2 Drawing Sheets

(58) Field of Classification Search
USPC ........ 34/77, 78, 80; 134/1, 904; 65/31, 33.2, 65/157
See application file for complete search history.

(56) References Cited

U.S. PATENT DOCUMENTS

| | | | | |
|---|---|---|---|---|
| 6,016,612 A * | 1/2000 | Kruwinus | ......... | H01L 21/67034 34/266 |
| 6,108,932 A * | 8/2000 | Chai | ................ | H01L 21/67034 34/245 |
| 6,119,366 A * | 9/2000 | Ferrell | .............. | H01L 21/67034 34/340 |
| 6,128,829 A * | 10/2000 | Wolke | ............... | H01L 21/67034 34/259 |
| 6,219,936 B1 * | 4/2001 | Kedo | ................ | H01L 21/67028 34/202 |
| 6,272,768 B1 * | 8/2001 | Danese | ............ | H01L 21/67086 34/202 |
| 6,457,478 B1 * | 10/2002 | Danese | ..................... | B08B 3/00 134/1.3 |
| 6,616,773 B1 * | 9/2003 | Kuzumoto | ................ | B08B 7/00 134/1.3 |
| 7,877,895 B2 * | 2/2011 | Otsuka | .............. | H01L 21/67748 118/725 |
| 8,020,315 B2 * | 9/2011 | Nishimura | ........ | H01L 21/02052 118/666 |
| 8,187,389 B2 * | 5/2012 | Miura | ....................... | G03F 7/42 134/1.1 |
| 9,333,467 B2 * | 5/2016 | Jang | .................... | B01F 7/00491 |
| 2002/0115275 A1 | 8/2002 | Choi | | |
| 2005/0242353 A1 | 11/2005 | Jang et al. | | |
| 2011/0240064 A1 * | 10/2011 | Wales | ..................... | C09D 5/14 134/26 |
| 2012/0097194 A1 * | 4/2012 | McDaniel | .............. | A01N 63/02 134/26 |
| 2014/0059878 A1 * | 3/2014 | Bilaine | .............. | B23K 26/0738 34/266 |
| 2014/0220327 A1 * | 8/2014 | Adib | ....................... | C03C 17/36 428/217 |
| 2016/0060167 A1 * | 3/2016 | Li | ....................... | C03C 23/0025 65/31 |
| 2016/0199887 A1 * | 7/2016 | Takezoe | .................. | B08B 3/123 134/1 |

FOREIGN PATENT DOCUMENTS

| | | | |
|---|---|---|---|
| JP | 2009176805 A | * | 8/2009 |
| JP | 2009224816 A | * | 10/2009 |
| JP | 2011175270 A | * | 9/2011 |

* cited by examiner

LOW TEMPERATURE POLY-SILICON THIN FILM PREPARATION APPARATUS AND METHOD FOR PREPARING THE SAME

RELATED APPLICATIONS

This application is a National Phase of PCT Patent Application No. PCT/CN2014/087179 having International filing date of Sep. 23, 2014, which claims the benefit of priority of Chinese Patent Application No. 201410444447.8 filed on Sep. 3, 2014. The contents of the above applications are all incorporated by reference as if fully set forth herein in their entirety.

FIELD OF THE INVENTION

The present invention relates to the technical field of manufacturing liquid crystal panels, and in particular to a low temperature poly-silicon thin film preparation apparatus and a method for preparing the same.

BACKGROUND OF THE INVENTION

In the liquid crystal display panel manufacturing industry, since a low temperature poly-silicon technology (LTPS) has better electron mobility, it has gradually become the innovation direction of the LCD panel technology.

During the low temperature poly-silicon manufacturing process, before a laser annealing treatment, a glass substrate is provided with an amorphous silicon, which requires cleaning by a cleaning agent (for example, hydrofluoric acid, HF) for cleaning the silicon film on the surface of the glass substrate, in which the hydrofluoric acid is configured to wash off glitches on the glass substrate. After the glass substrate is cleaned by the hydrofluoric acid cleaning agent, clean dry air (CDA) is used to blow off the liquid agent on the glass substrate, and then an oxide film is formed on the surface of the glass substrate which has been cleaned by hydrofluoric acid. Finally, the laser annealing treatment is processed to form a poly-silicon on the glass substrate, then a low temperature poly-silicon thin film is formed.

However, in practice, the inventors have found that in the conventional low temperature poly-silicon manufacturing process, the oxide film is not uniform, or large protrusions are formed during the laser annealing process, thereby resulting in high surface roughness of the low temperature poly-silicon thin film and a poor crystalline effect.

SUMMARY OF THE INVENTION

The objective of the present invention is to provide a low temperature poly-silicon thin film preparation apparatus and a method for preparing the same, which aims to reduce surface roughness of the low temperature poly-silicon, and improve the crystalline effect.

In order to solve the above problems, a technical solution of the present invention is as follows:

A low temperature poly-silicon thin film preparation apparatus is provided, which comprises: a substrate cleaning tank for cleaning a glass substrate, a conveying means for conveying the glass substrate being disposed within the substrate cleaning tank; an ozone generating means for generating ozone; a gas delivery tube, comprising an input terminal and an output terminal, the input terminal being connected to the ozone generating means, the output terminal being connected to the substrate cleaning tank at an upper portion of the glass substrate within the substrate cleaning tank; the output terminal of the gas delivery tube being provided with an air knife, the air knife comprises an air knife gas inlet port and an air knife gas outlet port, the air knife gas outlet port being disposed parallel to the glass substrate in order to blow the ozone uniformly to a surface of the glass substrate; wherein, after the glass substrate is cleaned in the substrate cleaning tank, the gas delivery tube delivers the ozone generated by the ozone generating means to the substrate cleaning tank in order to the blow out the ozone onto the surface of the cleaned glass substrate; a laser annealing means for processing a laser annealing treatment on the glass substrate, in order to form a low temperature poly-silicon thin film on the surface of the glass substrate.

In the above mentioned low temperature poly-silicon thin film preparation apparatus, a width of the air knife gas outlet port is greater than a width of the glass substrate.

In the above mentioned low temperature poly-silicon thin film preparation apparatus, the air knife gas outlet port has more than two uniformly disposed gas outlet ports.

In the above mentioned low temperature poly-silicon thin film preparation apparatus, a gap between two gas outlet ports is 0.3 mm to 0.8 mm.

In order to solve the above problems, the present invention further provides a technical solution as follows:

A low temperature poly-silicon thin film preparation apparatus is provided, wherein the preparation apparatus comprises: a substrate cleaning tank for cleaning a glass substrate; an ozone generating means for generating ozone; a gas delivery tube, comprising an input terminal and an output terminal, the input terminal being connected to the ozone generating means, the output terminal being connected to the substrate cleaning tank at an upper portion of the glass substrate within the substrate cleaning tank; wherein, after the glass substrate is cleaned in the substrate cleaning tank, the gas delivery tube delivers the ozone generated by the ozone generating means to the substrate cleaning tank in order to the blow out the ozone onto the surface of the cleaned glass substrate; a laser annealing means for processing a laser annealing treatment to the glass substrate in order to form a low temperature poly-silicon thin film on the surface of the glass substrate.

In the above mentioned low temperature poly-silicon thin film preparation apparatus, the output terminal of the gas delivery tube is provided with an air knife. The air knife comprises an air knife gas inlet port and an air knife gas outlet port. The air knife gas outlet port is disposed parallel to the glass substrate in order to blow the ozone uniformly to a surface of the glass substrate.

In the above mentioned low temperature poly-silicon thin film preparation apparatus, a width of the air knife gas outlet port is greater than a width of the glass substrate.

In the above mentioned low temperature poly-silicon thin film preparation apparatus, the air knife gas outlet port has more than two uniformly disposed gas outlet ports.

In the above mentioned low temperature poly-silicon thin film preparation apparatus, a gap between two gas outlet ports is 0.3 mm to 0.8 mm.

In the above mentioned low temperature poly-silicon thin film preparation apparatus, a conveying means for conveying the glass substrate is disposed within the substrate cleaning tank.

In order to solve the above problems, the present invention further provides a technical solution as follows:

A method for preparing a low temperature poly-silicon thin film, which comprises: cleaning a glass substrate by using a cleaning agent before the glass substrate processes a laser annealing treatment; uniformly blowing ozone onto a surface of the cleaned glass substrate in order to remove a residual liquid on the surface of the glass substrate, and forming an oxide film on the surface of the cleaned glass substrate; and processing the laser annealing treatment to the glass substrate which formed with the oxide film, forming a low temperature poly-silicon thin film on the surface of the glass substrate after the laser annealing treatment.

In the above method for preparing a low temperate poly-silicon thin film, the step of uniformly blowing ozone onto a surface of the cleaned glass substrate comprises: horizontally moving the cleaned glass substrate, and using an air knife to blow the ozone uniformly onto the surface of the glass substrate while the glass substrate is moving.

In the above method for preparing a low temperate poly-silicon thin film, the cleaning agent is hydrofluoric acid, HF.

Compared with conventional arts, the present invention provides a low temperature poly-silicon thin film preparation apparatus and a method for preparing the same, wherein in the preparation apparatus, the substrate cleaning tank is directly connected to the ozone generating means via the gas conveying tube, such that not only can it blow off the residual liquid on the surface of the cleaned glass substrate, but it can also allow the cleaned glass substrate to directly contact the ozone, making the silicon film on the surface of the glass substrate more smooth and less impure, and the oxide film formed on the surface is more uniform since it contacts the ozone at the first time after being cleaned by the hydrofluoric acid. Therefore the crystalline effect of the low temperature poly-silicon thin film obtained by the laser annealing treatment is more excellent; also, the design of the preparation apparatus is simple, which significantly reduces preparation costs.

DETAILED DESCRIPTION OF THE PREFERRED EMBODIMENTS

Please refer to the appended figures, wherein the same component symbol represents similar components, and the principle of the present invention is implemented in a suitable environment. The following descriptions for the respective embodiments are specific embodiments capable of being implemented for illustrations of the present invention, and should not be construed as limiting the other specific embodiments of the present invention which are not described herein.

Figure 1:
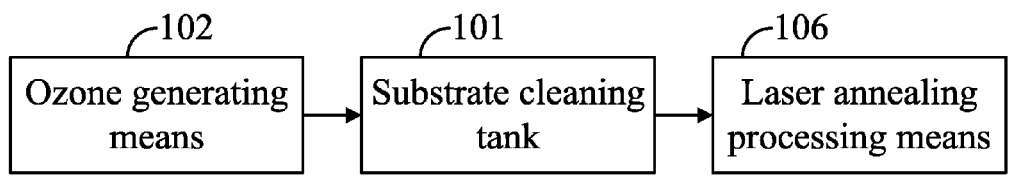
FIG. 1 is a schematic diagram of a low temperature poly-silicon thin film preparation apparatus provided by the present invention.
Figure 2:
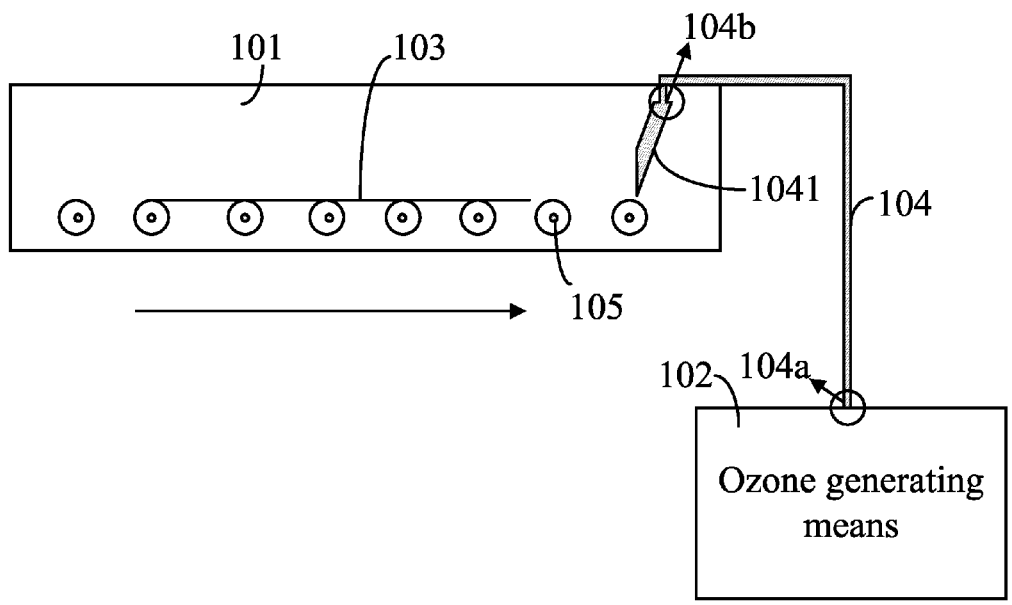
FIG. 2 is another schematic diagram of a low temperature poly-silicon thin film preparation apparatus provided by the present invention.

Please refer to FIG. 1, which is a schematic diagram of a low temperature poly-silicon thin film preparation apparatus provided by the present invention; the low temperature poly-silicon thin film apparatus comprises: a substrate cleaning tank 101, an ozone generating means 102, and a laser annealing treatment means 106. Also refer to FIG. 2, which is a specific structural schematic diagram of the low temperature poly-silicon thin film preparation apparatus, wherein FIG. 2 illustrates a connection relationship between the substrate cleaning tank 101 and the ozone generating means 102.

The substrate cleaning tank 101 is configured to clean a glass substrate 103; the ozone generating means 102 is configured to generate ozone ($O_3$); a gas delivery tube 104 comprises an input terminal 104a and an output terminal 104b, the input terminal 104a is connected to the ozone generating means 102, and the output terminal 104b is connected to the substrate cleaning tank 101 at an upper portion of the glass substrate 103 within the substrate cleaning tank 101; wherein after the glass substrate 103 is cleaned in the substrate cleaning tank 101, the gas delivery tube 104 delivers the ozone generated by the ozone generating means 102 to the substrate cleaning tank 101, in order to the blow out the ozone onto the surface of the cleaned glass substrate 103.

In particular, the ozone generated by the ozone generating means 102 is sequentially passing through the input terminal 104a, the gas delivery tube 104, the outlet terminal 104b, and finally blowing onto the substrate cleaning tank 101.

A laser annealing processing means 106 is configured to process a laser annealing treatment on the glass substrate which is taken out from the substrate cleaning tank 101, in order to form a low temperature poly-silicon thin film on a surface of the glass substrate 103.

Preferably, as shown in FIG. 2, the output terminal 104b of the gas delivery tube 104 is provided with an air knife 1041. Also refer to FIG. 3, the air knife 1041 comprises an air knife gas inlet port 1041a and an air knife gas outlet port 1041b, wherein the air knife gas outlet port 1041b is disposed parallel to the glass substrate 103, in order to blow the ozone uniformly onto the surface of the glass substrate 103.

That is, the gas delivery tube 104 disposed at the outlet port of the substrate cleaning tank 101 is directly connected to the ozone generating means 102, and allows the cleaned glass substrate 103 to directly contact the ozone. Preferably, the liquid remaining on the surface of the glass substrate 103 can also be leached off by adjusting the pressure of the ozone.

Figure 3:
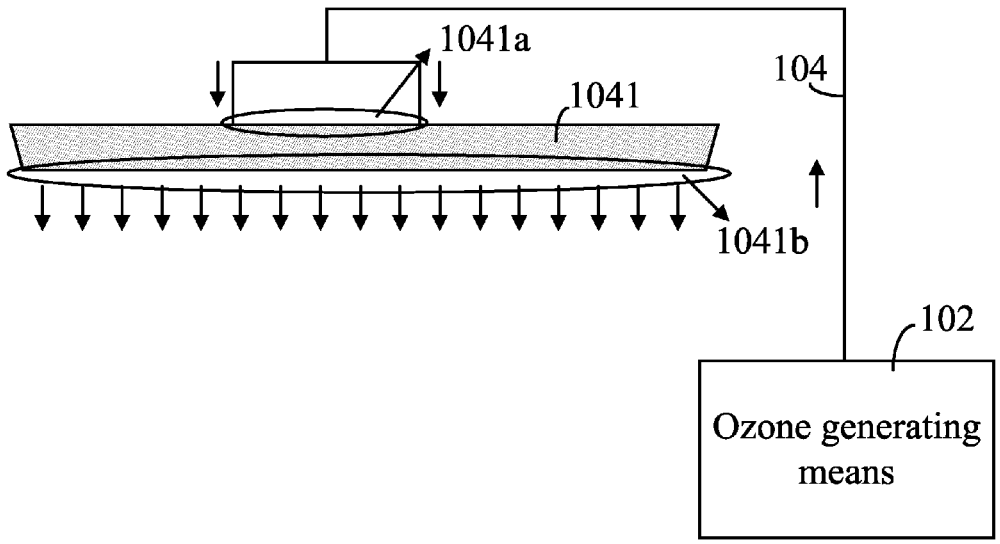
FIG. 3 is yet another schematic diagram of a low temperature poly-silicon thin film preparation apparatus provided by the present invention.

Furthermore, for the air knife structure shown in FIG. 3, a width of the air knife gas outlet port 1041b is greater than a width of the glass substrate 103. The air knife gas outlet port 1041b has more than two uniformly disposed gas outlet ports; wherein a gap between two gas outlet ports is 0.3 mm to 0.8 mm. Preferably, the gap between the gas outlet ports can be 0.5 mm, in order to uniformly blow the ozone form the air knife gas outlet port 1041b.

It should be appreciated that a conveying means 105 for conveying the glass substrate 103 is disposed within the substrate cleaning tank 101. After the glass substrate 103 is cleaned in the substrate cleaning tank 101, the conveying mean 105 is then turned on to convey the glass substrate to a position under the air knife gas outlet port 1041b.

The air knife can be considered as a dust and water removing device, which can be driven by a vortex blower or a high-pressure centrifugal fan (instead of high-energy compressed air CDA), by using different fans and air knives, the dust and water on the surface of an object may dry.

It can be understood that in the preparing process of the low temperature poly-silicon thin film, before the laser annealing treatment, the glass substrate is provided with an amorphous silicon, which should be cleaned by a cleaning agent (such as hydrofluoric acid, HF). Specifically, hydrofluoric acid is used to etch the surface of the glass substrate 103; after the glass substrate 103 is cleaned by the hydrofluoric acid, the ozone generating means 102 is turned on, and blows the ozone onto the surface of the glass substrate uniformly by the air knife 1041, allowing the cleaned glass substrate 103 to directly contact the ozone, such that the oxide film can be formed on the surface of the glass substrate 103 more uniformly and effectively. A poly-silicon (i.e., the low temperature poly-silicon thin film) with better a crystalline effect is then obtained after the laser annealing treatment.

From the foregoing, in the low temperature poly-silicon thin film preparation apparatus provided in the embodiment of the present invention, the substrate cleaning tank 101 is directly connected to the ozone gas generating device 102 via the gas delivery tube 104, such that not only can it blow off the residual liquid on the surface of the cleaned glass substrate 103, but it can also allow the cleaned glass substrate 103 to directly contact the ozone, making the silicon film on the surface of the glass substrate 103 more smooth and less impure. Also, the oxide film formed on the surface is more uniform since it contacts the ozone at the first time after being cleaned by the hydrofluoric acid, and therefore the crystalline effect of the low temperature poly-silicon thin film obtained by the laser annealing treatment is more excellent; also, the design of the preparation apparatus is simple, which significantly reduces preparation costs.

For a better implementation of the low temperature preparation apparatus provided in the embodiment of the present invention, the present invention further provides an embodiment of a method for preparing a low temperature poly-silicon thin film. The definition for nouns herein is the same as in the low temperature poly-silicon preparation apparatus described above, the specific implementation details can refer to the description of the low temperature poly-silicon preparation apparatus in the foregoing embodiments.

Figure 4:
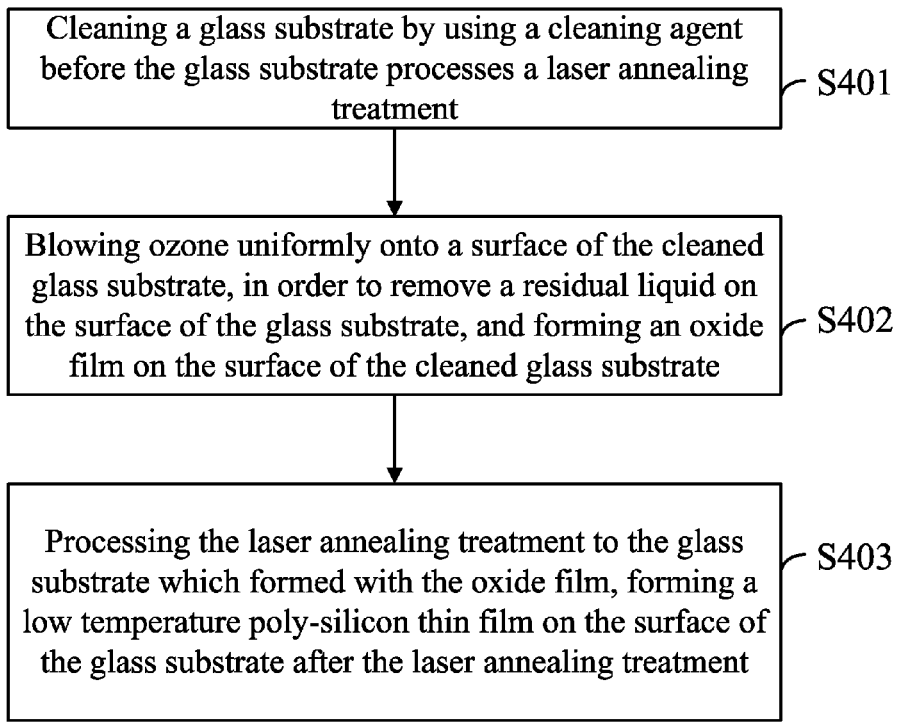
FIG. 4 is a schematic flow chart of a method for preparing a low temperature poly-silicon thin film provided by the present invention.

Please refer to FIG. 4, which is a schematic flow chart of a method for preparing a low temperature poly-silicon thin film provided by the present invention. The method for preparing a low temperature poly-silicon thin film is applied to the low temperature poly-silicon thin film preparation apparatus, which can also refer to FIG. 1, FIG. 2, and FIG. 3. The method for preparing the low temperature poly-silicon thin film comprises the steps of:

In step S401, cleaning a glass substrate by using a cleaning agent before the glass substrate processes a laser annealing treatment.

In step S402, uniformly blowing ozone onto a surface of the cleaned glass substrate to remove a residual liquid on the surface of the glass substrate, and forming an oxide film on the surface of the cleaned glass substrate.

In step S403, processing the laser annealing treatment to the glass substrate which formed with the oxide film, forming a low temperature poly-silicon thin film on the surface of the glass substrate after the laser annealing treatment.

Furthermore, the step of uniformly blowing ozone onto a surface of the cleaned glass substrate (i.e., step S402) in particular comprises: horizontally moving the cleaned glass substrate, and using an air knife to blow the ozone uniformly onto the surface of the glass substrate while the glass substrate is moving. Preferably, the cleaning agent is hydrofluoric acid.

Furthermore, the cleaning agent on the surface of the glass substrate can be leached off by adjusting the pressure of the ozone; in an embodiment of the present invention, the glass substrate can contact the ozone at the first time after it is cleaned by hydrofluoric acid. Also, the air knife can blow out the ozone more uniformly, and in higher concentrations, so that the oxide film is more uniform.

It can be understood that in the low temperature poly-silicon preparing process, before the laser annealing treatment, the glass substrate is provided with the amorphous silicon, which should be cleaned by a cleaning agent (such as hydrofluoric acid) for cleaning the silicon film on the surface of the glass substrate, where the hydrofluoric acid is configured to wash off the glitches on the glass substrate. In the present invention, incorporated herein by reference to FIGS. 2 and 3, before the laser annealing treatment, the glass substrate 103 is placed in the substrate cleaning tank 101, which is for cleaning the glass substrate 103, specifically, etching the surface of the glass substrate 103 by hydrofluoric acid HF. After the glass substrate 103 is cleaned by the hydrofluoric acid cleaning agent, the ozone generating means 102 is turned on, and the air knife 1041 is used to blow the ozone onto the surface of the glass substrate uniformly. That is, it allows the cleaned glass substrate 103 to directly contact the ozone, making the surface of the glass substrate 103 form a more uniform and efficient oxide film, so as to obtain the poly-silicon (i.e., the low temperature poly-silicon thin film) with better a crystalline effect after the laser annealing.

From the foregoing, since the method for preparing a low temperature poly-silicon thin film provided by the embodiments of the present invention is applied in a preparation apparatus, with the substrate cleaning tank directly connected to the ozone generating means via the gas delivery tube, not only is the residual liquid on the surface of the cleaned glass substrate blown off, but also the cleaned glass substrate is allowed to directly contact the ozone, making the silicon film on the surface of the glass substrate more smooth and less impure; and the oxide film formed on the surface is more uniform since it contacts the ozone at the first time after cleaned by the hydrofluoric acid. Therefore, the crystalline effect of the low temperature poly-silicon thin film obtained by the laser annealing treatment is more excellent.

Furthermore, it should be appreciated that the present invention also provides a low temperature poly-silicon thin film prepared by the low temperature poly-silicon thin film preparing method described above. Preferably, the low temperature poly-silicon thin film has a thickness of 30 to 100 nm.

In the above embodiments, the descriptions of the various embodiments have different emphases; parts without a detailed description in a certain embodiment can be referred to the detailed descriptions above, and will not be repeated herein.

A person skilled in the art will recognize that the word "preferred" used herein means serving as an example, instance, or illustration. Any aspect or design described herein as "preferred" is not necessarily to be construed as advantageous over other aspects or designs. Rather, the use of the word "preferred" is intended to present concepts in a concrete fashion. As used in this application, the term "or" is intended to mean an inclusive "or" rather than an exclusive "or". That is, unless specified otherwise, or clear from context, "X employs 101 or 102" is intended to mean any of the natural inclusive permutations. That is, if X employs 101; X employs 102; or X employs both 101 and 102, then "X employs 101 or 102" is satisfied under any of the foregoing instances.

Moreover, despite one or more implementations relative to the present disclosure being illustrated and described, equivalent alterations and modifications will occur to others skilled in the art upon reading and understanding this specification and the annexed drawings. The present disclosure comprises such modifications and variations, and is to be limited only by the terms of the appended claims. In particular, regarding the various functions performed by the above described components, the terms used to describe such components (i.e. elements, resources, etc.) are intended to correspond (unless otherwise indicated) to any component, which performs the specified function of the described component (i.e., that is, functionally equivalent), even though not structurally equivalent to the disclosed structure which performs the function in the illustrated implementations of the disclosure. In addition, although a particular feature of the disclosure may have been disclosed with respect to only one of several implementations, such a feature may be combined with one or more other features of the other implementations as may be desired and advantageous for any given or particular application. Also, to the extent that the terms "including", "includes", "having", "has", "with", or variants thereof are used in the detailed description or in the claims, such terms are intended to be inclusive in a manner similar to the term "comprising".

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present invention is defined by the appended claims rather than the foregoing description and the exemplary embodiments described therein.

What is claimed is:

1. A low temperature poly-silicon thin film preparation apparatus, comprising:
    a substrate cleaning tank for cleaning a glass substrate, a conveying means for conveying the glass substrate being disposed within the substrate cleaning tank;
    an ozone generating means for generating ozone;
    a gas delivery tube, comprising an input terminal and an output terminal, the input terminal being connected to the ozone generating means, the output terminal being connected to the substrate cleaning tank at an upper portion of the glass substrate within the substrate cleaning tank;
    the output terminal of the gas delivery tube being provided with an air knife, the air knife comprising an air knife gas inlet port and an air knife gas outlet port, the air knife gas outlet port being disposed parallel to the glass substrate, in order to blow the ozone onto a surface of the glass substrate uniformly;
    wherein, after the glass substrate is cleaned in the substrate cleaning tank, the gas delivery tube delivers the ozone generated by the ozone generating means to the substrate cleaning tank, in order to the blow the ozone onto the surface of the cleaned glass substrate;
    a laser annealing means for processing a laser annealing treatment to the glass substrate, in order to form a low temperature poly-silicon thin film on the surface of the glass substrate.

2. The low temperature poly-silicon thin film preparation apparatus according to claim 1, wherein a width of the air knife gas outlet port is greater than a width of the glass substrate.

3. The low temperature poly-silicon thin film preparation apparatus according to claim 1, wherein the air knife gas outlet port has more than two uniformly disposed gas outlet ports.

4. The low temperature poly-silicon thin film preparation apparatus according to claim 3, wherein a gap between two gas outlet ports is 0.3 mm to 0.8 mm.

5. A low temperature poly-silicon thin film preparation apparatus, comprising:
    a substrate cleaning tank for cleaning a glass substrate;
    an ozone generating means for generating ozone;
    a gas delivery tube, comprising an input terminal and an output terminal, the input terminal being connected to the ozone generating means, the output terminal being connected to the substrate cleaning tank and connected to an upper portion of the glass substrate within the substrate cleaning tank;
    wherein, after the glass substrate is cleaned in the substrate cleaning tank, the gas delivery tube delivers the ozone generated by the ozone generating means to the substrate cleaning tank, in order to the blow the ozone onto the surface of the cleaned glass substrate;
    a laser annealing means for processing a laser annealing treatment to the glass substrate, in order to form a low temperature poly-silicon thin film on the surface of the glass substrate.

6. The low temperature poly-silicon thin film preparation apparatus according to claim 5, wherein the output terminal of the gas delivery tube is provided with an air knife, the air knife comprises an air knife gas inlet port and an air knife gas outlet port, the air knife gas outlet port being disposed parallel to the glass substrate, in order to blow the ozone onto the surface of the glass substrate uniformly.

7. The low temperature poly-silicon thin film preparation apparatus according to claim 6, wherein a width of the air knife gas outlet port is greater than a width of the glass substrate.

8. The low temperature poly-silicon thin film preparation apparatus according to claim 6, wherein the air knife gas outlet port has more than two uniformly disposed gas outlet ports.

9. The low temperature poly-silicon thin film preparation apparatus according to claim 8, wherein a gap between two gas outlet ports is 0.3 mm to 0.8 mm.

10. The low temperature poly-silicon thin film preparation apparatus according to claim 8, wherein a conveying means for conveying the glass substrate is disposed within the substrate cleaning tank.

* * * * *